U. S. BROWN.
ROTARY CULTIVATOR.
APPLICATION FILED JAN. 10, 1910.
972,503.
Patented Oct. 11, 1910.
2 SHEETS—SHEET 1.
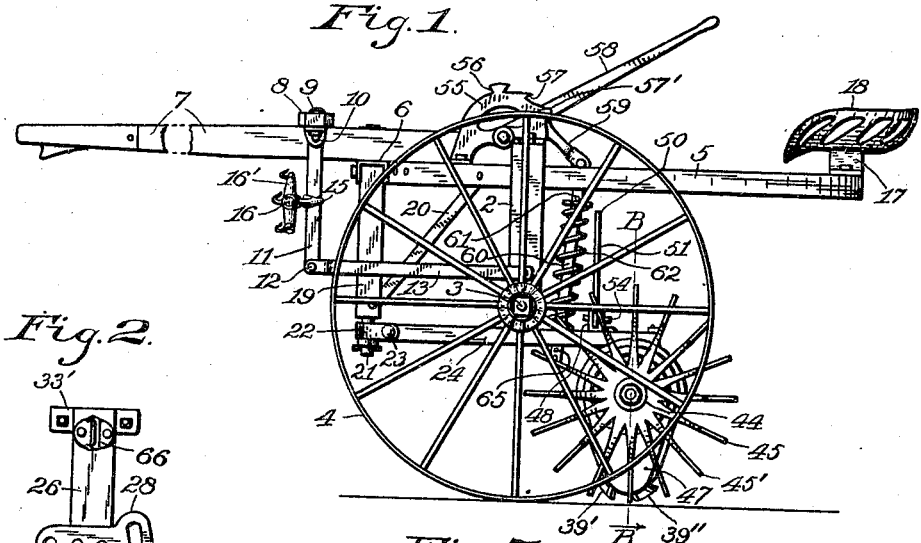
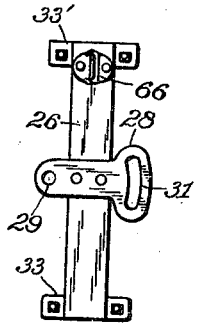
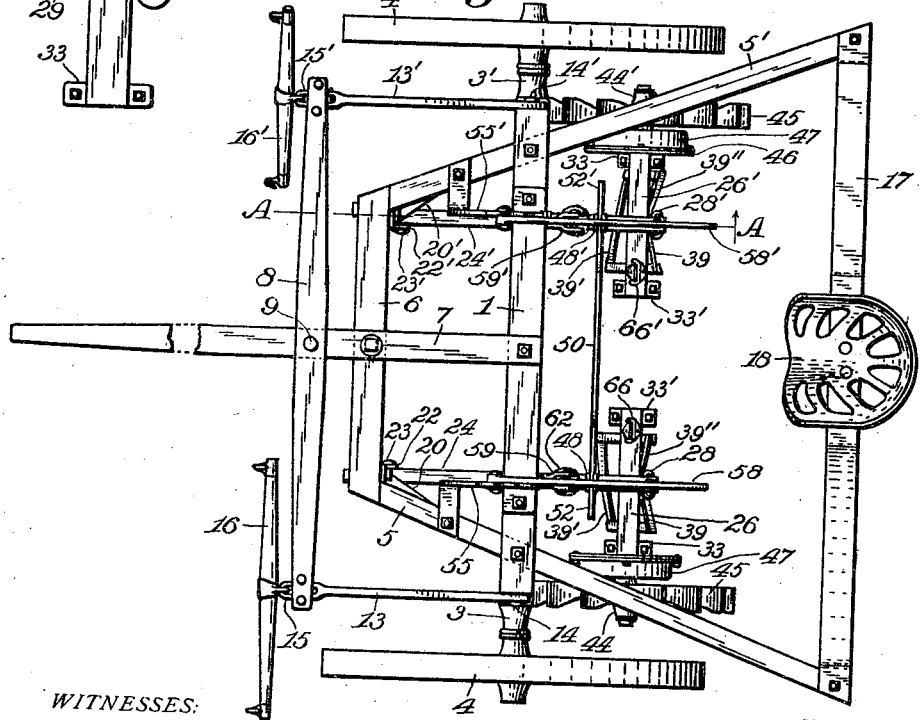
WITNESSES:
J. H. Gardner
K. R. Woddell
INVENTOR:
Ulysses S. Brown,
BY
E. T. Silvius.
ATTORNEY.

U. S. BROWN.
ROTARY CULTIVATOR.
APPLICATION FILED JAN. 10, 1910.
972,503.
Patented Oct. 11, 1910.
2 SHEETS—SHEET 2.
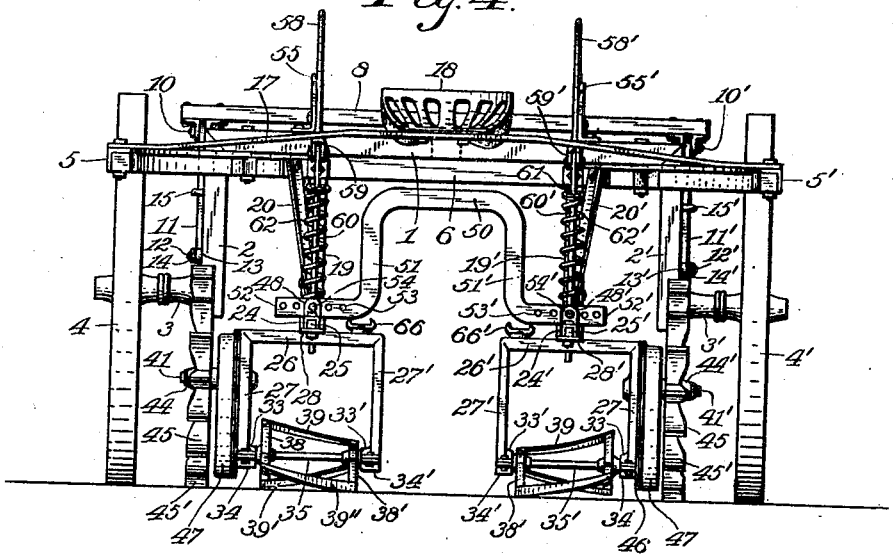
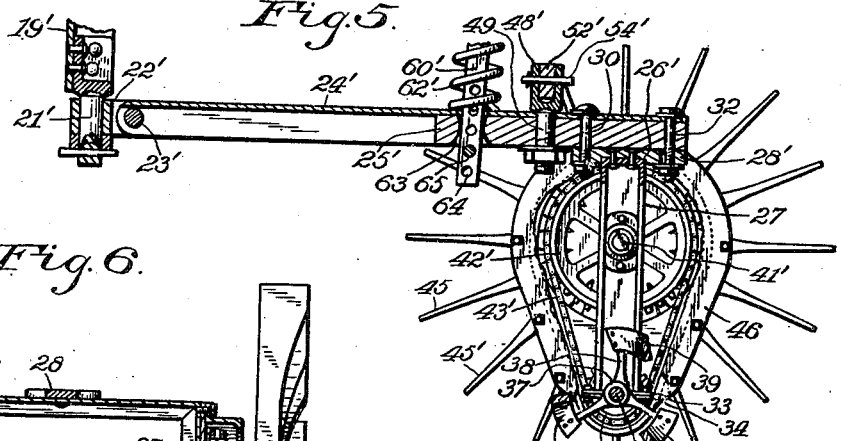
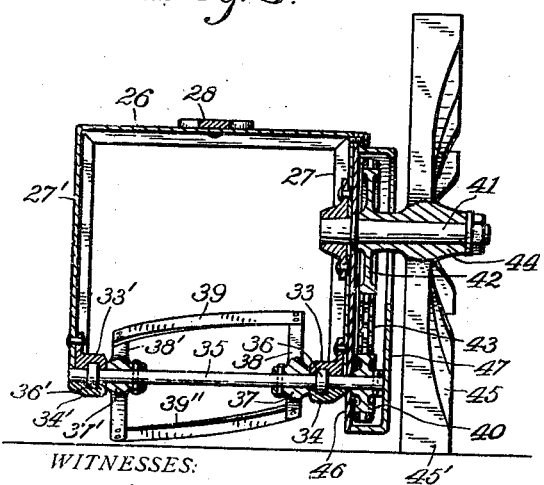
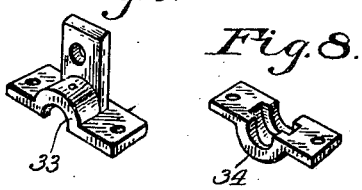
WITNESSES:
J. H. Gardner
K. R. Woddell
INVENTOR:
Ulysses S. Brown,
BY
E. T. Silvius,
ATTORNEY.
THE NORRIS PETERS CO., WASHINGTON, D. C.

UNITED STATES PATENT OFFICE.

ULYSSES S. BROWN, OF LOGANSPORT, INDIANA.

ROTARY CULTIVATOR.

972,503. Specification of Letters Patent. Patented Oct. 11, 1910.

Application filed January 10, 1910. Serial No. 537,275.

*To all whom it may concern:*

Be it known that I, ULYSSES S. BROWN, a citizen of the United States, residing at Logansport, in the county of Cass and State of Indiana, have invented certain new and useful Improvements in Rotary Cultivators; and I do declare the following to be a full, clear, and exact description of the invention, reference being had to the accompanying drawings, and to the letters and figures of reference marked thereon, which form a part of this specification.

This invention relates to the class of implements that are designed to be used for destroying weeds and loosening the earth between rows of growing corn or other grain or vegetables, the invention having reference more particularly to a cultivator that is designed to chop the weeds and therefore more effectually destroy them, and to lift and turn over the earth in order to thoroughly pulverize it.

The object of the invention is to provide a cultivator that will be capable of thoroughly breaking up the earth as is desired and not merely turn over large clods of the earth as is frequently done by cultivators heretofore used, a further object being to so construct and operate the cultivating devices that they will be adapted in operation to cut or chop the weeds besides digging them up and turning them over, in order to as far as possible immediately kill the weeds and thus prevent them from again taking root, a still further object being to provide a double sulky cultivator that will be adapted to fulfil the requirements in accordance with the above-mentioned and other objects.

The invention consists in a rotary cultivator comprising one or more rotatable cultivating devices each including one or more blades adapted to be forced downward into the ground to cut the weeds and earth and to turn them over, and gearing adapted to be actuated by rolling contact with the ground for rotating the cultivating device or devices faster than the prime mover that is actuated by rolling contact with the ground; and the invention consists further in the parts and combinations and arrangements of parts as hereinafter particularly described and then defined in the accompanying claims.

Referring to the drawings, Figure 1 is a side elevation of the improved cultivator as preferably constructed; Fig. 2, a top plan of one of the frames of the rotatable cultivating devices; Fig. 3, a top plan of the complete cultivator; Fig. 4, a rear elevation of the cultivator; Fig. 5, a fragmentary vertical section on the line A A in Fig. 3; Fig. 6, a fragmentary vertical section on the line B B in Fig. 1; and Figs. 7 and 8, perspective views of a journal-box and its cap preferably employed in construction.

Similar reference characters in the different figures of the drawings indicate corresponding elements or features of construction referred to herein.

The main frame may in part be of well known or any other suitable construction and comprises preferably an arched axle consisting of a horizontal member 1, two vertical members 2 and 2' and two axle ends 3 and 3' that are mounted in carrying wheels 4 and 4'; two horizontal frame members 5 and 5' secured between their ends to the member 1 and adjacent to the members 2 and 2' of the axle, the forward ends of the frame members being closer together than the rear ends thereof and connected by a horizontal frame member 6 to which a tongue 7 is attached, the tongue being attached also to the member 1 of the axle and having a double-tree 8 connected thereto by a pin 9 slightly forward of the frame member 6, the double-tree carrying pivots 10 and 10' on the under sides of its ends, the pivots having equalizers 11 and 11' connected thereto and provided at their lower ends with pivots 12 and 12' to which are connected draft rods 13 and 13' that are connected to the upright members 2 and 2' of the axle by means of pivot bolts 14 and 14'. The equalizers 11 and 11' are provided between their ends with draft eyes 15, 15', to which swingle-trees 16, 16', are connected for draft purposes and to which horses may be hitched as usual. A beam 17 is mounted on the rear ends of the frame members 5 and 5' and supports the driver's seat 18 at a suitable distance rearward of the axle and in alinement with the tongue. The main frame comprises also two members 19 and 19' that extend downward from the forward ends of the frame members 5 and 5' and ends of the member 6 and are provided with braces 20 and 20' that are connected to the lower portions thereof and also to the members 5 and 5'.

The channel-iron and angle-iron are preferably employed where suitable in the construction of the main frame and axle. The lower ends of the frame members 19 and 19' are each provided with a vertical pivot as 21 or 21' for drawing the cultivating devices on the ground, there being two adjustable cultivator frames connected to the pivots of the main frame, the cultivator frames comprising pivot-heads 22 and 22' mounted on the pivots 21 and 21' respectively, and provided with horizontal pivots 23 and 23' to which the forward ends of frame beams 24 and 24' are connected, the beams preferably composed of channel iron bars having filling pieces 25 and 25' in the channels. The frames comprise also transverse bars 26 and 26' having each a pair of legs 27 and 27' on its ends and arranged so that the legs 27 of the two frames are outermost and operate as right hand and left hand frames, the bars 26 and 26' being provided with bearing plates 28 and 28' respectively having each a pivot hole 29 therein whereby the plate is connected by means of a pivot-bolt 30 to the longitudinal beam 24 or 24', the bearing plates also having each a curved slot 31 therein through which a bolt 32 extends and secures a bearing plate adjustably to the beam, so that when the rear ends of beams 24 and 24' are spread apart or drawn together the bars 26 and 26' may be readjusted relatively to the beams to bring the bars into alinement. The lower ends of the legs 27 and 27' are provided with journal boxes 33 and 33' having caps 34 and 34' in which are mounted cultivator shafts 35 and 35' in reverse arrangement, the shafts having each a pair of guide collars or flanges 36 and 36' thereon that run in suitable recesses in the journal boxes and aid in preventing the legs from spreading apart.

Each cultivating device comprises two hubs 37 and 37' secured to the cultivator shaft and having each a suitable number of arms 38, 38' thereon to which are secured a suitable number of blades 39, there being preferably three blades, as 39, 39', 39'', carried by each cultivator shaft. The arms on the hubs are all equal in length, but the arms on one hub are so set or placed that they lead the arms on the companion hub and the blades are twisted correspondingly, one end of each blade, therefore striking the ground in advance of the opposite end, so that shearing cuts in the ground result in operation. The blades of each gang are arranged so as to be adapted to throw the earth from them toward the opposite gang, and therefore drawing the earth slightly toward the row of plants between the two gangs of cultivating devices. The shafts 35 and 35' extend through the journal boxes of the legs 27, and one shaft has a small sprocket wheel 40 secured thereto at the outer side of the leg, the upper portion of the leg having a stud axle 41 mounted thereon that rotatably supports a sprocket wheel 42 that is relatively larger than the sprocket wheel 40, the two sprocket wheels being operatively connected together by means of a sprocket chain 43. The other shaft 35' is similarly provided with a sprocket wheel 40', the leg 27 of the other cultivator frame carrying an axle 41' on which is a large sprocket wheel 42' connected with the smaller sprocket-wheel by a sprocket-chain 43'. A pair of driving wheels are provided for rotating the cultivating devices and comprise hubs 44 and 44' mounted on the axles 41 and 41' and connected to the larger sprocket-wheels 42 and 42', respectively, so as to rotate the sprocket wheels, each hub 44 and 44' having a suitable number of arms as 45, 45' thereon, there being a sufficient number of arms to enable the wheel to roll on the ground and to be rotated by contact with the ground, the ends of the arms being adapted to slightly penetrate the surface of the ground. It will be understood, of course, that the wheels may be variously modified in detail, so as to operate most effectively on the ground which may be of different character in different sections of the country. The sprocket-wheels and chains are protected from the soil by suitable casings comprising preferably each a plate 46 attached to the leg 27, and a box 47 connected to the plate and extending around the gearing.

The two cultivator frames are adjustably connected together at their rear or movable ends by means of a yoke and connections, the beams 24 and 24' being provided with swiveled jaws 48 and 48' respectively, that have each a shank 49 mounted rotatably in the beam, the yoke comprising a horizontal arch member 50 and vertical members 51 and 51' from the lower ends of which extend horizontal members 52 and 52' having a suitable number of pin holes 53 and 53' therein whereby they are connected adjustably to the jaws by pins 54 and 54'.

In order to control the cultivating devices and also to carry them free from the ground when not in use, a pair of lever stands 55 and 55' are mounted upon the main frame and have each a notch 56 and also a suitable number of notches 57 in the upper portion thereof, a pair of levers 58 and 58' being mounted on the stands and provided each with a lug 57' adapted to be moved into the notches, the levers being elastic laterally, or other suitable latching devices obviously may be employed if preferred. The levers have arms 59 and 59' thereon respectively to which stiff links 60 and 60' are connected and provided each with a stop pin 61, coil-springs 62 and 62' being mounted on the links and engaging the stop pins and also the beams 24 and 24', the links extending through apertures 63 in the beams and having pin-holes 64 therein to receive pins 65 that may engage the under sides of the beams to enable the levers to lift the beams, the springs normally holding the beams down yieldingly, so that the cultivator blades may be forced into the ground by means of the levers, the springs permitting the blades to pass over stones or the like. A pair of foot rests 66 and 66' are mounted on the tops of the bars 26 and 26' of the cultivator frames, so that the driver may be enabled to guide the cultivating devices away from the plants if necessary.

In practical use the cultivator is drawn forward in the usual manner by means of animals, and the driver when sitting on the seat 18 may readily guide the animals which obviously guide the machine with the cultivating devices at opposite sides of a row of plants. The driver may readily reach and manipulate the controlling levers, as may be desired, and control the depth to which the ground is desired to be loosened. As the machine rolls along the ground it will be clear that the driving wheels of the cultivating devices must also roll, the ends of the arms thereof constituting their peripheries in effect, and it will be clear that the larger sprocket wheels connected with the smaller sprocket wheels must rotate the cultivating devices faster than the rate of rotation of the driving wheels, with the result that the cultivator blades dig into the earth and throw the earth upward and rearward, so that the earth becomes effectually loosened and in operation the blades also cut and turn over the weeds. The two gangs may be readily readjusted each with respect to the other when desired as hereinbefore described. When moving from one field to another or elsewhere and in turning at the ends of rows the cultivator frames may be elevated on movement of the controlling levers forward, and latching them by means of the notches 56 in the lever stands.

Having thus described the invention, what is claimed as new, is—

1. A cultivator including carrying wheels, a main frame mounted in the wheels, a cultivator frame connected at one end thereof to the main frame and comprising two legs, a shaft mounted rotatively in the two legs, cultivating devices mounted on the shaft between the two legs, a gear-wheel secured to the shaft adjacent to one of the two legs, a traction-wheel mounted rotatively on the said leg with its axis above the shaft, and gearing adjacent to said leg connected with the traction-wheel and the gear-wheel.

2. A cultivator including carrying wheels, a main frame mounted in the wheels, a cultivator frame connected to the main frame and comprising two legs, one leg having an axle on one side thereof, each leg having a journal-box on the end thereof that has a recess therein, a shaft mounted in the journal-box and having collars thereon that extend into the recesses, the shaft extending through one of the journal-boxes and having a small sprocket-wheel thereon, cultivator-blades mounted on the shaft, a large sprocket-wheel rotative on the axle and having a hub thereon, arms on the hub, a sprocket-chain connected with the sprocket-wheels, a plate attached to the leg that has the axle thereon, and a box connected to the plate and therewith inclosing the sprocket-wheels and the sprocket-chain.

3. A cultivator including carrying wheels, a main frame mounted in the wheels, a cultivator-frame comprising a beam and two legs connected to the beam, the beam being connected loosely to the main frame, a shaft mounted rotatably in the legs and having a small sprocket-wheel secured thereto, a plurality of cultivating-blades carried by the shaft, an axle attached to one of the legs, a sprocket-wheel rotative on the axle and having a hub thereon, arms on the hub, and a sprocket-chain connected operatively with the two sprocket-wheels.

4. A cultivator including a pair of carrying wheels, a main frame mounted in the wheels, a pair of cultivator-frames connected to the main frame to move pivotally in vertical and horizontal directions and provided each with a pair of legs, one leg of each pair having an axle thereon, a pair of shafts each mounted rotatably in a pair of legs and having a pair of hubs and also a gear wheel secured thereto, the hubs having arms thereon, blades carried by the arms, two driving wheels each rotatable on one of the axles, and two gear wheels each connected to one of the driving-wheels to be driven thereby and operatively conneceted also with one of the gear-wheels of the shaft.

In testimony whereof, I affix my signature in presence of two witnesses.

ULYSSES S. BROWN.

Witnesses:
 GEO. W. WALTERS,
 OTTO A. SCHORMEYER.